(12) United States Patent
Munro

(10) Patent No.: US 10,392,269 B2
(45) Date of Patent: Aug. 27, 2019

(54) PORTABLE WATER PURIFICATION SYSTEMS WITH ADJUSTABLE SOLAR POSITIONING APPARATUS

(71) Applicant: Kevin E. Munro, Auburn, WA (US)

(72) Inventor: Kevin E. Munro, Auburn, WA (US)

( * ) Notice: Subject to any disclaimer, the term of this patent is extended or adjusted under 35 U.S.C. 154(b) by 924 days.

(21) Appl. No.: 14/049,489

(22) Filed: Oct. 9, 2013

(65) Prior Publication Data
US 2015/0096937 A1   Apr. 9, 2015

(51) Int. Cl.
*B01D 61/10* (2006.01)
*C02F 1/44* (2006.01)
*C02F 103/08* (2006.01)

(52) U.S. Cl.
CPC .............. *C02F 1/441* (2013.01); *B01D 61/10* (2013.01); *B01D 2313/36* (2013.01); *C02F 2103/08* (2013.01); *C02F 2201/008* (2013.01); *C02F 2201/009* (2013.01); *Y02A 20/131* (2018.01); *Y02A 20/211* (2018.01); *Y02A 20/212* (2018.01)

(58) Field of Classification Search
None
See application file for complete search history.

(56) References Cited

U.S. PATENT DOCUMENTS

| | | | | |
|---|---|---|---|---|
| 4,194,949 A | * | 3/1980 | Stark | B01D 3/00 126/634 |
| 5,017,284 A | * | 5/1991 | Miler | B01D 61/025 210/175 |
| 8,685,238 B2 | * | 4/2014 | Gunter | C02F 1/325 210/141 |
| 8,808,537 B1 | * | 8/2014 | Livingston | C02F 9/005 210/196 |
| 2004/0108280 A1 | * | 6/2004 | Saraceno | C02F 9/005 210/748.11 |
| 2006/0260672 A1 | * | 11/2006 | Niederer | F03D 9/007 136/251 |
| 2007/0199875 A1 | * | 8/2007 | Moorey | B01D 61/147 210/206 |

(Continued)

OTHER PUBLICATIONS

Spectra Aquifer Expedition. Datasheet [online]. Spectra Watermakers, Feb. 2011 [retrieved on Sep. 16, 2013]. Retrieved from the Internet: <URL: http://www.spectrawatermakers.com/documents/tmp/Aquifer_Expedition.pdf>.

(Continued)

*Primary Examiner* — Jonathan M Peo
(74) *Attorney, Agent, or Firm* — Kilpatrick Townsend & Stockton LLP

(57) ABSTRACT

A portable water purification system is disclosed. The system can have a water storage receptacle, a reverse osmosis filter, a pump, and a solar panel array group. The reverse osmosis filter can be configurable to convert source water into drinkable water, and the pump can be configurable to provide the source water from a water source to the reverse osmosis filter. The array group can have at least one bi-fold solar panel array, and the array group can be configurable to provide power for the pump. The water storage receptacle can be configurable to contain the drinkable water in one configuration and configurable to contain at least one component of the purification system for storage in another configuration.

3 Claims, 7 Drawing Sheets

(56) References Cited

U.S. PATENT DOCUMENTS

| | | | | |
|---|---|---|---|---|
| 2007/0251569 A1* | 11/2007 | Shan | ............................ | F24J 2/08 |
| | | | | 136/246 |
| 2010/0109601 A1* | 5/2010 | Coyle | ...................... | B60L 8/003 |
| | | | | 320/102 |
| 2011/0073748 A1* | 3/2011 | Chan | ...................... | G01S 3/7861 |
| | | | | 250/203.4 |
| 2012/0006670 A1* | 1/2012 | Kamen | ................. | B01D 1/0082 |
| | | | | 202/185.1 |

OTHER PUBLICATIONS

Spectra Aquifer 150-200 Expedition. Owner's Manual [online]. Spectra Watermakers, Nov. 2011 [retrieved on Sep. 16, 2013]. Retrieved from the Internet: <URL: http://www.spectrawatermakers.com/documents/manuals/Aquifer_Expedition.pdf>.

* cited by examiner

PORTABLE WATER PURIFICATION SYSTEMS WITH ADJUSTABLE SOLAR POSITIONING APPARATUS

BACKGROUND OF THE INVENTION

Over two-thirds of the Earth is covered with salt water, and there is a relatively unlimited supply of solar energy. On the other hand, it is becoming clear that access to fresh water will be one of the biggest challenges for humanity in the 21$^{st}$ century. Unfortunately, in many areas of the world there is limited access to fresh water sources.

In some instances, the lack of access can be attributed to a lack of electricity and power to filter water effectively. Poor areas, for example, typically cannot afford the costs required for installing infrastructure for electricity. In other instances, the lack of access can be attributed to a disaster. Often disasters such as hurricanes or earthquakes can cause a sudden great need for fresh water to meet basic hydration needs of victims, while simultaneously destroying any freshwater reserves, contaminating freshwater sources, and/or drastically damaging infrastructure and the ability to transport large supplies of relief fresh water.

Accordingly, purifying water in these environments is an ongoing challenge, since increasingly worse and more extreme conditions call for purification systems to be increasingly eco-friendly, durable, inexpensive, and readily portable.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments herein are directed to a water purification system. In one embodiment, a portable water purification system is provided having a water storage receptacle, a reverse osmosis filter, a pump, and a solar panels array group. The reverse osmosis filter can be configurable to convert source water into drinkable water, and the pump can be configurable to provide the source water from a water source to the reverse osmosis filter. The array group can have at least one bi-fold solar panel array, and the array group can be configurable to at least one of provide power for the pump or charge a battery. The water storage receptacle is configurable to contain the drinkable water or configurable to contain at least one component for storage. The at least one component can be at least one of the pump, the reverse osmosis filter, the array group, a battery, or a power inverter. The water purification system can also have an array connector group having at least one connector configurable to connect at least one array in the array group with the exterior of the water storage receptacle.

In embodiments, the portable water purification system further comprises a battery and a power inverter. The battery can be configurable to be charged by the array group and configurable to provide power for the pump. The power inverter can be configurable to at least one of convert power from the array group or from the battery to a type of power required by the pump.

In embodiments, the portable water purification system includes at least one wheel operably coupled with the water storage receptacle and configured to facilitate movement of the water storage receptacle relative to a support surface when it is to be moved relative to the support surface. In embodiments, the portable water purification system includes at least one tie down operably coupled with the water storage receptacle and configured to inhibit movement of the water storage receptacle relative to the support surface when it is not to be moved relative to the support surface.

In embodiments, a configurable water purification system is provided which includes a water storage receptacle, a pump, a power source, and a filter and has an operation configuration and a storage configuration. In the operation configuration, the power source provides power to operate the pump, the pump is operable to provide source water to the filter, the filter is operable to convert the source water into drinkable water, and the drinkable water is stored in the water storage receptacle. In the storage configuration, at least one of the pump, the power source, or the filter is stored in the water storage receptacle.

In embodiments, the configurable water purification system power source includes a Stirling engine. In embodiments, the configurable water purification system includes at least one Fresnel lens to focus solar energy on a heat exchanger of the Stirling engine. In embodiments, the power source comprises at least one solar panel.

In embodiments, the water receiving receptacle of the configurable water purification system includes an integrated compartment configurable to house at least one of the pump or the osmosis filter. In embodiments, the configurable water purification system includes a float switch responsive to a water level in the water storage receptacle, and the float switch is operatively connected to the pump to turn off the pump when the water level reaches a designated level.

In embodiments, the configurable water purification system includes a lid operable to seal the water storage receptacle. In embodiments, the configurable water purification system includes an air pressure release valve configurable to release an air pressure buildup within the water storage receptacle.

In embodiments, the configurable water purification system includes at least one tie down operably coupled with the water storage receptacle, and the tie down(s) is/are configurable to inhibit movement of the water storage receptacle relative to the support surface when the water storage receptacle is not to be moved relative to a support surface. In embodiments, the configurable water purification also includes at least one wheel operably coupled with the water storage receptacle and configurable to facilitate movement of the water storage receptacle relative to a support surface when the water storage receptacle is to be moved relative to a support surface.

In embodiments, the configurable water purification system further comprises a battery and a power inverter. The battery can be configurable to be charged by the array group and configurable to provide power for the pump. The power inverter can be configurable to at least one of convert power from the array group or from the battery to a type of power required by the pump. In embodiments, the configurable water purification system includes a battery tray hinged with the water storage receptacle, and the battery tray is configurable to support the battery relative to the water storage receptacle.

In embodiments, the configurable water purification system includes a monitor operatively coupled with the water storage receptacle; the monitor can be configurable for displaying at least one of flow characteristics and water characteristics.

In embodiments, the configurable water purification system includes an object connector group having at least one object connector. Each object connector can be configurable to connect at least one object with the exterior of the water storage receptacle, and the at least one object can be at least one of the pump, the power source, a Stirling engine, a Fresnel lens, a solar panel, the reverse osmosis filter, an array group, a battery, a power inverter, a lid, a tie down, or a monitor.

In embodiments, a method for purifying water is provided. The method includes removing at least one of a pump, a reverse osmosis filter, or a power supply from a container and assembling at least one of the pump, the reverse osmosis filter, or the power supply in a configuration with the container to remove at least an impurity from source water. The method also includes operating at least one of the pump, the reverse osmosis filter, or the power supply to remove at least the impurity from the source water to produce potable water, and storing the potable water in the container.

For a fuller understanding of the nature and advantages of the present invention, reference should be made to the ensuing detailed description and accompanying drawings.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Disclosure herein is directed to a portable water purification system. In embodiments disclosed herein, various components of a water purification system during travel can be housed inside a receptacle that can also be used during operation to contain the purified water produced by the system. Such functionality can be advantageous in a variety of ways. For example, such an arrangement can be a more efficient use of space which allows an increased ease of portability due to a reduction in cargo space needed to transport all of the requisite parts needed for purification. Additionally, a compact configuration can also help a purification system to have a small footprint, making it easier to manage, operate, store, and/or maneuver. Furthermore, use of a common container for all components can help keep all of the necessary parts together, diminishing the risk that the system could become inoperable due to a piece becoming lost. Benefits can also include ease of setting the system up and/or packing it up, particularly when components have designated storage and/or operational positions.

Figure 1:
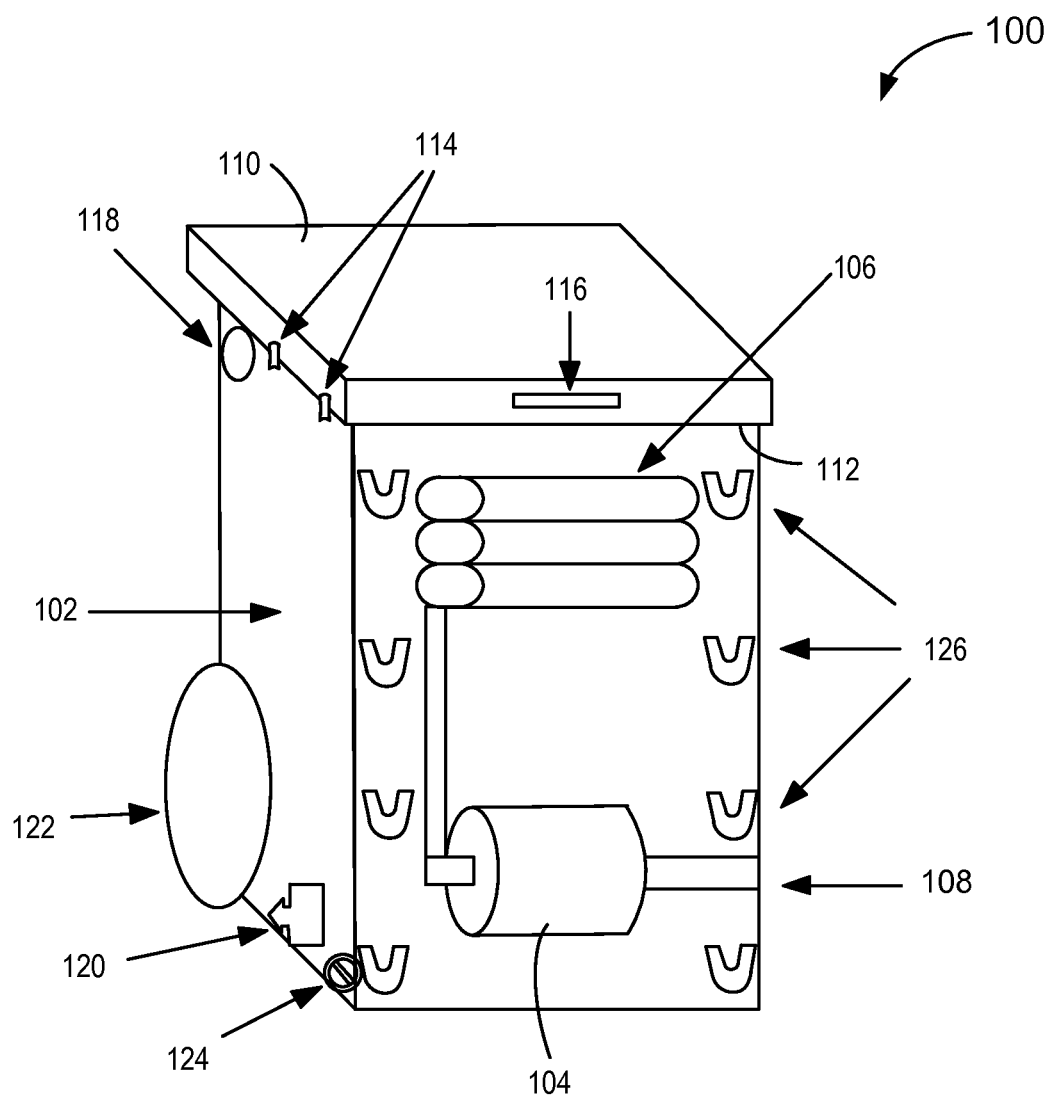
FIG. 1 shows a front right view of a portable water purification system in accordance with embodiments.

Referring now to the drawings, in which like reference numerals represent like parts throughout the several views, FIG. 1 shows a front right view of a portable water purification system 100 in accordance with embodiments. In embodiments, the portable water purification system 100 comprises a tank or other water storage receptacle 102, a pump 104, and a filter 106. The water storage receptacle 102 may be made of any suitable material, but in many embodiments, the water storage receptacle 102 comprises food grade plastic so as to provide a sanitary storage container for drinkable water, such as the drinkable water produced in accordance with various embodiments by water purification system 100.

In accordance with embodiments, generally, a filter 106 in portable water purification system 100 can be any porous material through which water can be passed in order to remove at least some particulate matter from the water. A wide variety of filter 106 materials and methods are known in the art, including reverse osmosis filters 106. Functionally, a reverse osmosis filter 106 receives an input of water containing a certain starting concentration of contaminants or impurities and produces two outputs: purified water with a contaminant concentration much lower than the starting concentration and brine water with a contaminant concentration higher than the starting concentration. A reverse osmosis filter achieves this result by the use of a pressure differential across a selective membrane. The selective membrane has pores sized to be smaller than a contaminant particle size but large enough to allow the passage of water molecules. Thus, as contaminant-bearing water is placed under sufficient pressure on a first side of the selective membrane, water molecules pass through the membrane to the second side, while the contaminant particles too large to pass through the membrane pores are retained on the first side. The water accumulated on the second side provides the purified water output, while the water on the first side—with the retained contaminants—provides the brine output having a higher concentration of contaminants (i.e., the concentration increases on the first side of the selective filter because the amount of water there decreases—due to water siphoning off through the selective filter—but the total amount of contaminants remains the same). In many instances, salt is the targeted contaminant, and a reverse osmosis filter 106 can receive an input of seawater or other saltwater and produce a freshwater or at least drinkable (i.e., potable) output and an output of brine having a salt concentration slightly higher than the input saltwater.

In embodiments, for operation of the purification system 100, a source water intake 108 can be connected to a source of water to be purified (e.g. salt water or water containing an undesirable level of contaminants), such as by a hose, pipe, tube, spigot, spout, or other appropriate conduit. The pump 104 can be utilized to provide the pressure and/or flow necessary to move the source water provided by an intake 108 through the filter 106 to accomplish purification. The purified water outputted by the filter 106 can be routed into the water storage receptacle 102 for later use. In embodiments, the brine outputted by a reverse osmosis filter 106 can be disposed of in any acceptable manner. For example, when the purification system 100 is used with seawater, the brine can be routed back to the sea where it is quickly diluted.

In embodiments, the water storage receptacle 102 can have a lid 110. Sealing the water storage receptacle 102 can advantageously limit the risk of introducing contaminants into the purified water contained within the water storage receptacle 102. The lid 110 can have a gasket 112 to ensure that water storage receptacle 102 is well sealed when the lid 110 is in place. In embodiments, lid 110 has one or more latches 114 to ensure that water storage receptacle 102 is well sealed when the lid 110 is in place. The lid 110 can also have one or more handles 116 to facilitate opening, closing or positioning of the lid 110 on the water storage receptacle 102.

In various embodiments, additional or supplemental measures can be utilized to minimize the risk of purified water becoming contaminated during storage. For example, in embodiments, the interior of the water storage receptacle 102 can be treated with a disinfectant prior to introducing purified water therein. In some embodiments, clear sterile plastic bags or liners can be utilized inside the water storage receptacle 102 to ensure that purified water introduced into the water storage receptacle 102 is not exposed to any contaminants that have been introduced into the receptacle 102.

In some embodiments, the water storage receptacle 102 has an air pressure release valve 118 configurable to release air pressure buildup within the water storage receptacle 102. In embodiments the water storage receptacle 102 has a hose, pipe, tube, spigot, spout, or other appropriate conduit to serve as a purified water output 120 for draining the water storage receptacle 102 and/or for transferring purified water to other containers.

In embodiments, the water storage receptacle 102 is outfitted with wheels 122. Wheels 122 can provide the water purification system 100 with improved ease of portability when the purification system 100 is not operating. Although only one of two wheels 122 is shown in FIG. 1, any number of wheels 122 can be used in varied embodiments, including just one wheel 122, three wheels 122, four wheels 122, or more. In embodiments, the water storage receptacle 102 is outfitted with tie-downs 124 or the like. Tie-downs 124 can be used to stabilize the water storage receptacle 102 when the purification system 100 is operating. Although only one of four tie downs 124 is shown in FIG. 1, any number of tie downs 124 can be used in varied embodiments, including just one tie down 124, two tie downs 124, three tie downs 124, or more.

Figure 2:
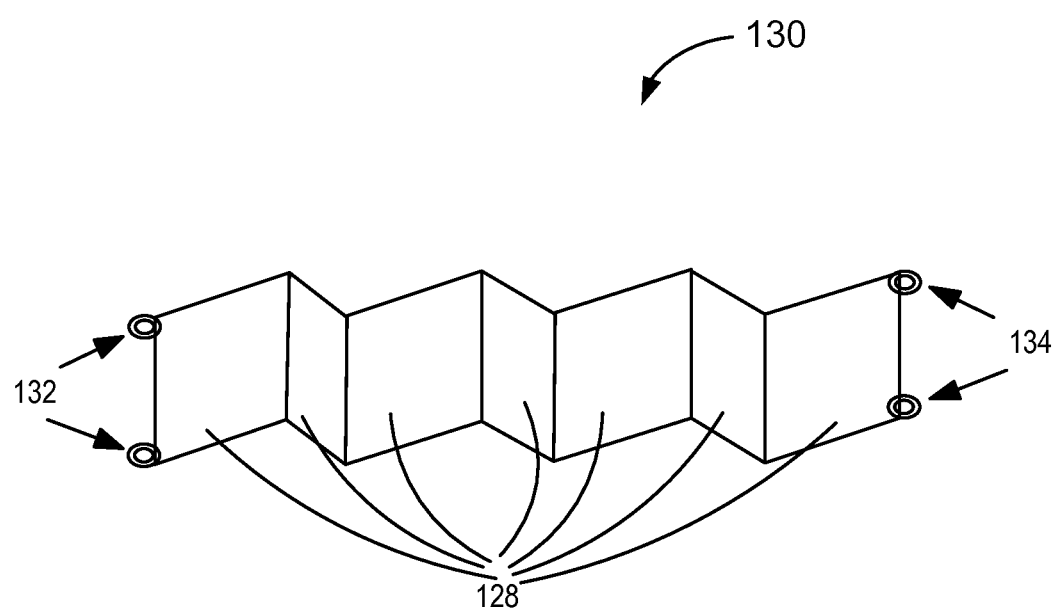
FIG. 2 shows a bi-fold locking solar panels array for use in the portable water purification system in accordance with embodiments.

FIG. 2 shows a bi-fold locking solar panels array 130 for use in the portable water purification system 100 in accordance with embodiments. In embodiments, any suitable power source can be utilized to provide power for the pump 104. In various embodiments, the water purification system 100 utilizes one or more solar panels array 130 having one or more solar panels 128 as a power source to provide power to the pump 104. As shown in FIG. 2, in various embodiments, seven solar panels 128 are arranged in a solar panels array 130 in a bi-fold locking pattern; however a solar panels array 130 can have any number of solar panels 128, which can also be arranged in a variety of other ways. Solar panels 128 can include a plurality of photo-voltaic cells as known in the art for converting light into electrical energy.

In various embodiments, a solar panels array 130 can have various connectors 132 which interface with connectors 126 on the water storage receptacle 102 in order to support the solar panels array 130 relative to the water storage receptacle 102. In various embodiments, the solar panels array 130 can have tie downs 134 in order to secure the solar panels array 130 in place during operation of the purification system 100. A solar panels array 130 in embodiments can be adjusted and secured so as to refine the array's 130 orientation relative to the sun, and in various embodiments, the variability provided by the combination of tie downs 134 and connectors 132 provide the solar panels array 130 with this adjustability. Accordingly, in many embodiments, the solar panels array 130 can be aligned differently according to the season and time of year so as to maximize the solar panels array's 130 collection of solar energy.

Figure 3:
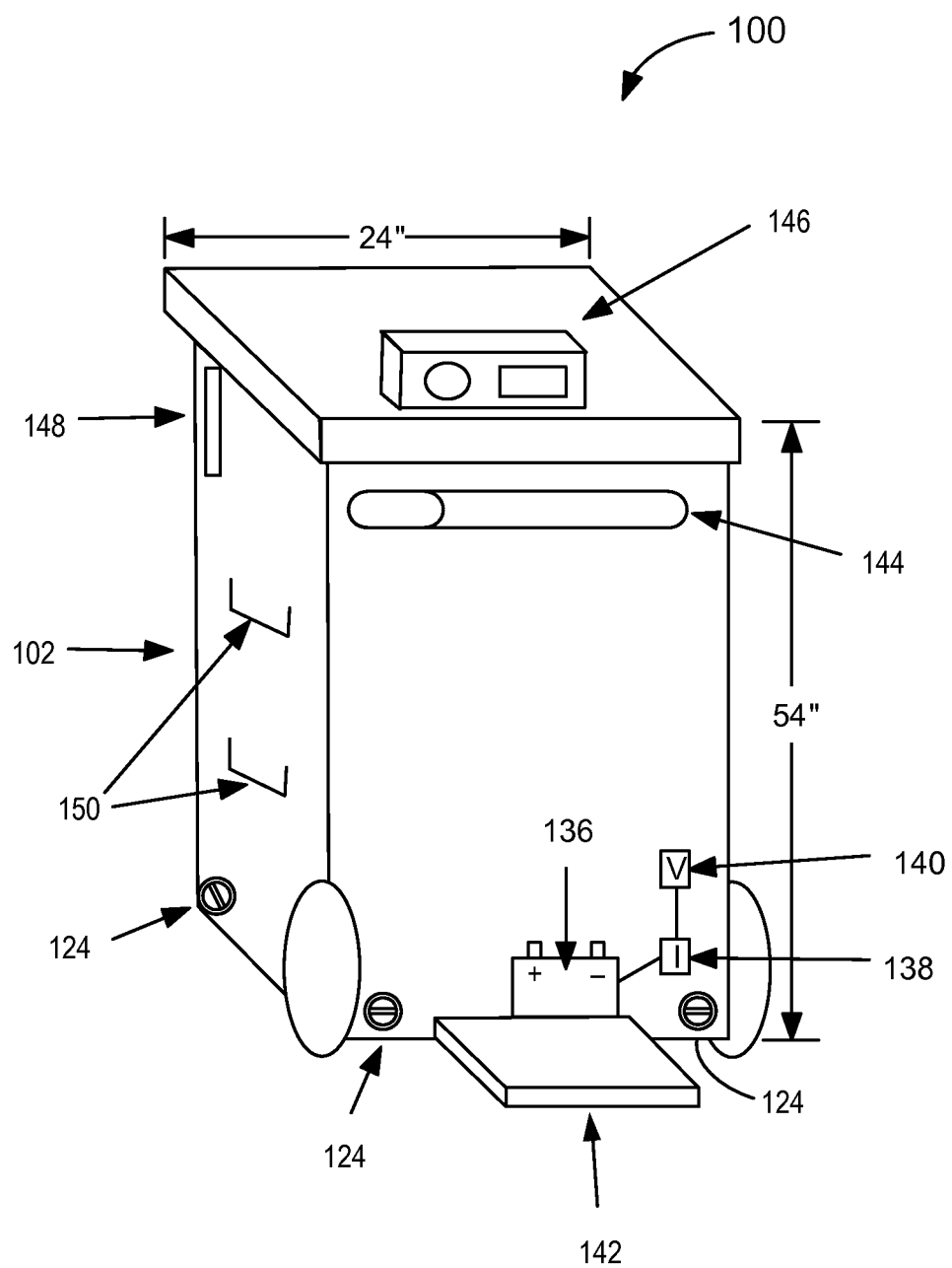
FIG. 3 shows a left rear view of a portable water purification system in accordance with embodiments.

FIG. 3 shows a left rear view of a portable water purification system 100 in accordance with embodiments. As shown in FIG. 3, in various embodiments, purification system 100 can also comprise one or more batteries 136. In embodiments, a battery 136 can be used as a power source for the pump 104. A battery 136 can provide a stable source of electric energy, which can also be an advantageous addition to a system using solar panels 128. Solar panels 128 may often produce a constantly varying level of energy based on constantly varying intensity of sunlight, and electrical energy production from a solar panel 128 may suddenly drop or cease all together during cloudy or night-time periods or in other scenarios in which direct light is otherwise inhibited or obscured. In various embodiments, one or more solar panels arrays 130 are used to charge a battery 136, which in turn is used to power pump 104. A power inverter 138 can also be used in accordance with various embodiments to convert electrical energy between direct current (DC) and alternating current (AC) as necessary to provide the pump 104 with the appropriate form of electrical energy. In some embodiments, a voltage transformer 140 is also provided to adjust the voltage level provided by the battery 136 and/or solar panels 128 to the level necessitated by the model and type of pump 104 used in purification system 100.

As shown in FIG. 3, in some embodiments, a battery tray 142 can be provided to support the battery 136, the inverter 138, and/or the transformer 140 relative to the water storage receptacle 102. In some embodiments, the battery tray 142 can be hingedly connected to the water storage receptacle 102 or otherwise configured to be stored to make the purification system 100 more compact to facilitate the movement or relocation of the purification system 100. In various embodiments, one or more handles 144 are also provided on water storage receptacle 102. In embodiments, handle 144 placement can further facilitate the ease of movement or relocation of the purification system 100 by a user.

Figure 4:
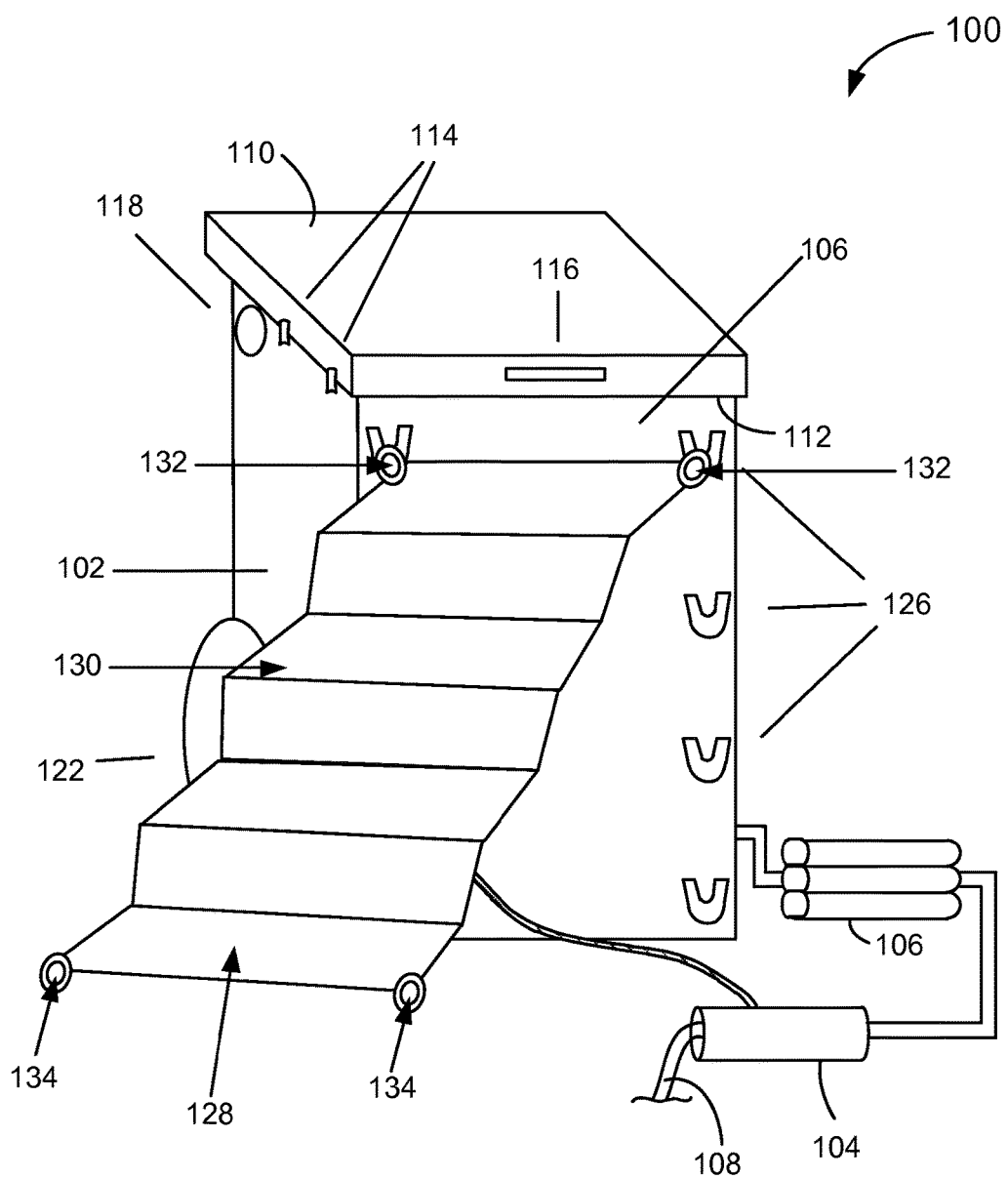
FIG. 4 shows a portable water purification configured for operation in accordance with embodiments.

As shown in FIG. 1, in some embodiments one or both of the pump 104 and the reverse osmosis filter 106 are located in integrated housing within the water storage receptacle 102 during operation and/or transport of the water purification system 100. However, in various embodiments, this is not the case, and either one or both of the pump 104 and the reverse osmosis filter 106 can be located outside of the water receptacle 102 during operation or transport of the system 100. For example, FIG. 4 shows a portable water purification configured for operation in accordance with embodiments. As may be seen in FIG. 4, in embodiments, the pump 104 can be located outside the container 102 and deliver source water to the filter 106. In embodiments, the filter 106 can be located outside the container 102 and provide purified water to be stored in the container 102. In embodiments, solar panels arrays 130 can be set up outside of the container 102 and operable to provide power to the pump 104. In some embodiments, the solar panels arrays 130 can be connected to the outside of the container 102, such as by connectors 126. In other embodiments, the solar panels arrays 130 can be utilized without being mounted on the container 102.

Figure 5:
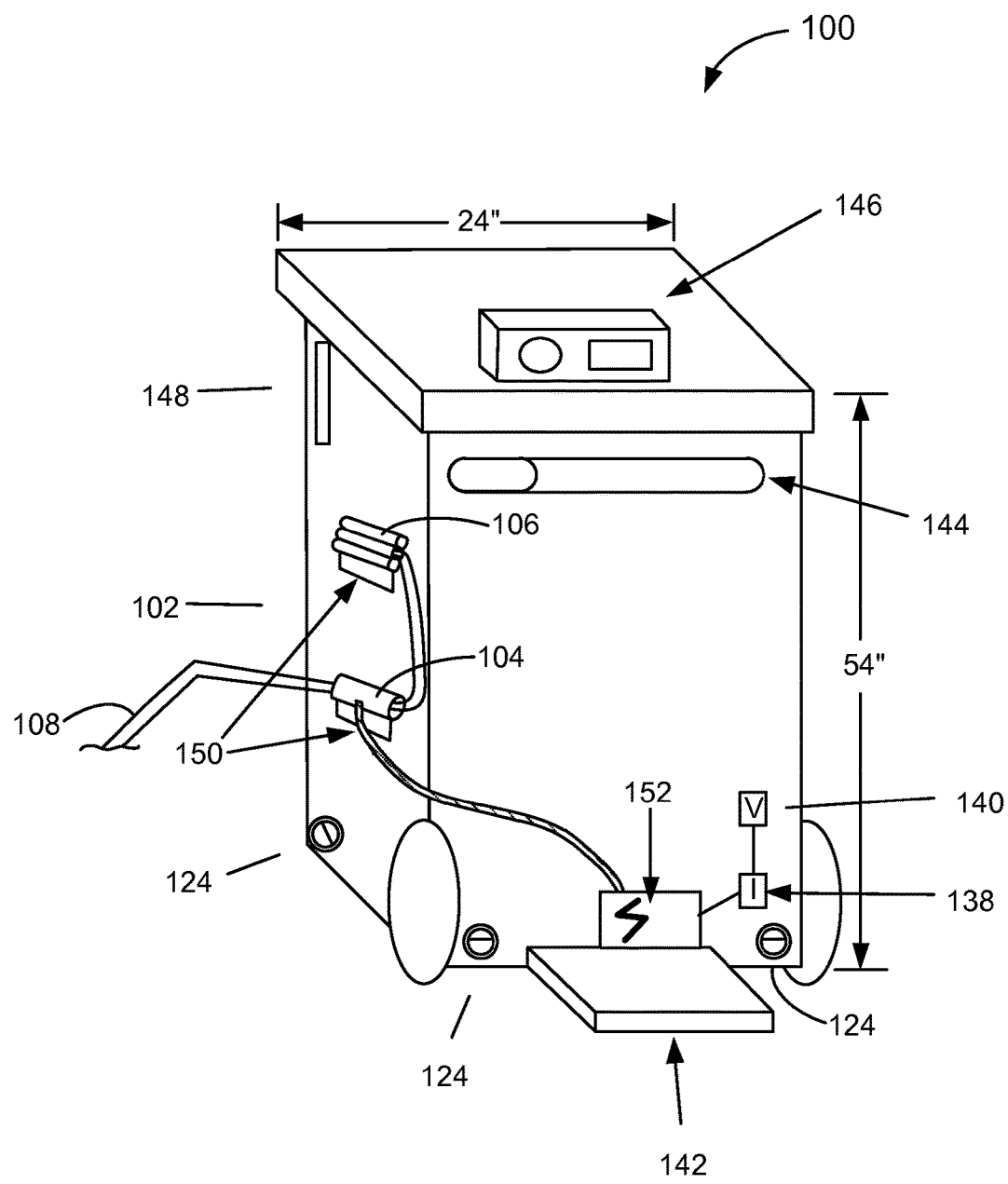
FIG. 5 shows a portable water purification system utilizing a power source in accordance with embodiments.

FIG. 5 shows a portable water purification system 102 utilizing a power source 152 in accordance with embodiments. In addition to power sources 152 discussed in more detail in the disclosure herein, in embodiments, the pump 104 can be powered by one or more other power sources 152 known in the art including, but not limited to, a combustion engine; a steam engine; a Stirling engine powered by either direct sunlight or sunlight amplified through a lens such as a Fresnel lens; a Stirling engine powered by heat from burning wood, coal, or other fuel; a turbine harnessing wind, water, or geothermal energy; and/or mechanisms such as cranks that are operable to allow manual operation of the pump by hand for an individual or through harnessed work of livestock.

Figure 6:
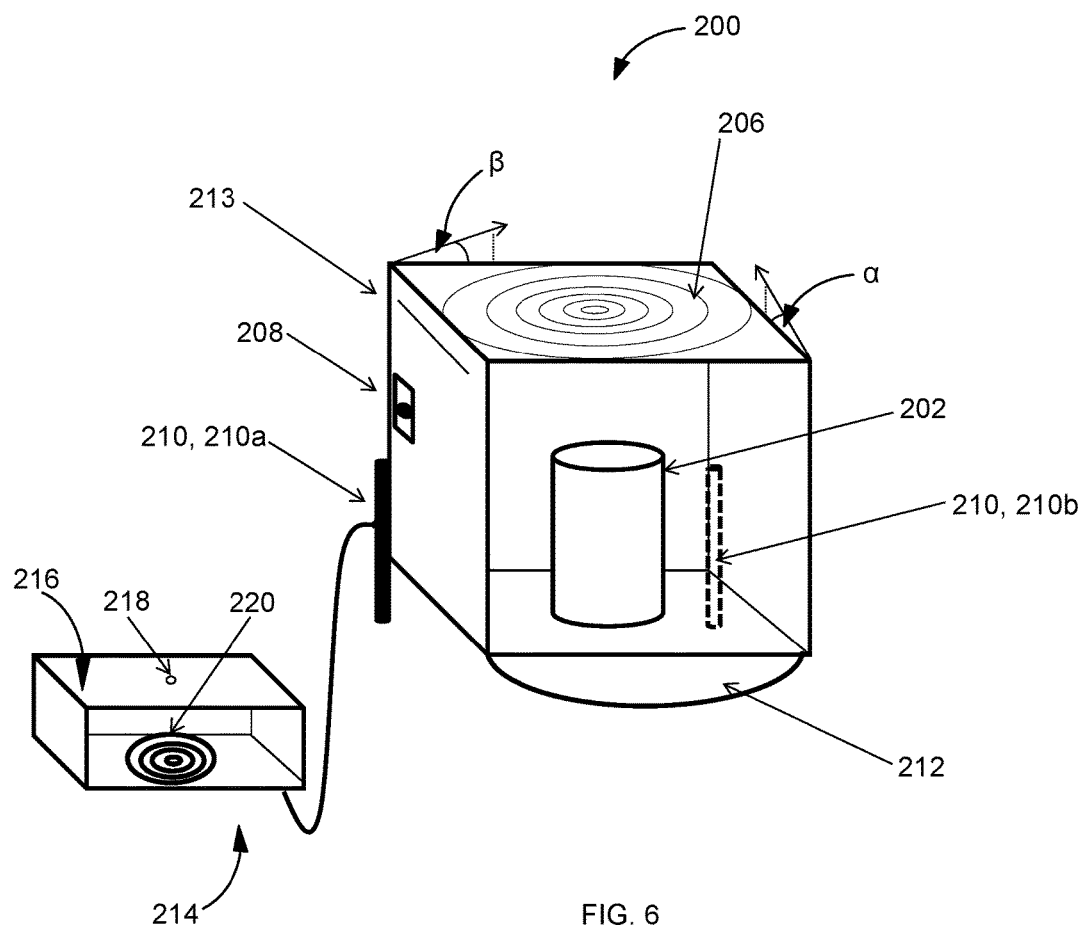
FIG. 6 shows a positioning apparatus configured with a Stirling engine in accordance with embodiments.

FIG. 6 shows a positioning apparatus 200 configured with a Stirling engine 202 in accordance with embodiments. In embodiments, a positioning apparatus 200 can include an enclosure 204 with a Stirling engine 204 located therein. In embodiments, a lens 206 is located at or near the top of the enclosure 204. The lens 206 may be any suitable type of lens and may be constructed of any suitable material. However, in various embodiments, the lens 206 is a Fresnel lens, and in embodiments, the lens is constructed of a polycarbonate material. In various embodiments, the lens 206 is positioned so as to focus solar energy on the Stirling engine 204. In embodiments, the solar energy is focused on a heat exchanger of the Stirling engine 204, providing the heat differential necessary to cause engine parts to move and generate electricity. The enclosure can further include a power output connection 208 in various embodiments by which an electrical device, for instance, a pump 104 or a battery 136, can access the electricity generated by the Stirling engine 202. In embodiments, the enclosure 204 can also include an ambient heat vent 213 to release heat build up within the enclosure 204.

In various embodiments, the positioning apparatus 200 can be adjusted in order to modify the orientation of the positioning apparatus 200 and/or of the lens 206 relative to the sun. This modified positioning can advantageously allow for increased collection of solar energy, thereby improving the performance of the Stirling engine 202. In various embodiments, the positioning apparatus 200 can include one or more adjustable legs 210 connected to a base of the positioning apparatus 200. The one or more adjustable legs 210 can be adjusted individually or collectively in order to reorient the positioning of the apparatus 200 and/or the lens 206. In embodiments, the positioning apparatus 200 can also have one or more fixed supports—such as the curved support 212 shown in FIG. 6—to provide additional stability during and/or after positioning by the one or more adjustable legs 210. Additionally, while FIG. 6 (as discussed below) shows a positioning apparatus 200 having two legs 210 and one support 212, any number of legs and any number of supports may be used. The legs and support members can support the base of the positioning apparatus relative to a support surface. Each leg and each support member can contact the support surface at a location distinct from where any other leg or support contacts the support surface. Each leg and each support member can contact the base at a location distinct from where any other leg or support contacts the base.

In an example embodiment shown in FIG. 6, the positioning apparatus 200 has a first adjustable leg 210a at a rear left corner, a second adjustable leg 210b at a rear right corner, and a curved support 212 extending down from a front face. In this embodiment, pitch (represented as an angle α in FIG. 6), can be modified by adjusting the legs 210a and 210b by the same amount in the same direction so that the positioning apparatus 200 tilts in a forward or backward direction. In this embodiment, roll (represented as an angle (3 in FIG. 6), can be modified by adjusting the legs 210a and 210b by the same amount in opposite directions so that the positioning apparatus 200 tilts in a left or right direction. Additionally, in this embodiment, the legs 210a and 210b can be adjusted by differing amounts in order to modify both pitch and roll at the same time. The curvature of the curved support 212 in this embodiment allows the front of the positioning apparatus 200 to always have a third point of contact with the surface supporting the positioning apparatus 200, regardless of the pitch and/or roll provided by the legs 210. Accordingly, as shown in FIG. 6, in various embodiments, the positioning apparatus 200 and/or lens can be adjusted relative to the sun (e.g., oriented perpendicular to the sun) to adjust and/or maximize collection of solar energy.

According to differing embodiments, these positioning adjustments may be performed manually and/or automatically. In some embodiments, a light direction detector 214 is provided to facilitate automatic positioning of the positioning apparatus 200. In embodiments, the light direction detector includes an enclosure 216, an aperture 218, and light sensing surface 220. In operation in various embodiments, the aperture 218 allows a small amount of sunlight to pass through the exterior of the enclosure 216 and reach light sensing surface 220. In embodiments, the aperture 218 limits the sunlight passing through it such that the sunlight only illuminates a small portion of the light sensing surface 220. Because the angle at which sunlight passes through the aperture 218 correlates to the sun's location in the sky, the sun's orientation is accordingly also indicated by the portion of the light sensing surface 220 that is illuminated by the sunlight passing through the aperture 218. In embodiments, the light sensor surface 220 is configured to detect which portion of the light sensor surface 220 is illuminated, and this detection can be used to adjust the orientation of positioning apparatus 200 or lens 206. For example, in some embodiments, the light sensor surface 220 is operably configured to control one or more servos that adjust the height of one or more legs 210, thereby altering the pitch and/or roll of the positioning apparatus 200 or lens 206 and affecting the amount of solar energy collection. In varying embodiments, the light sensor 220 can be operable for servo control by electronic circuitry, by use of a processor, or by any other appropriate means known or later developed in the art.

Additionally, while descriptions of a positioning apparatus 200 have thus far been primarily directed to configuration with a Stirling engine, the positioning apparatus 200 is not so limited. The positioning apparatus 200 could also be configured with other components disclosed herein, including, but not limited to, configuration with a solar panels array 130. Furthermore, the positioning apparatus 200 can be used independently of water purification systems and may be utilized in any setting to adjust the orientation of an object relative to the position of the sun in the sky.

In embodiments, the water purification system 100 can have one or more monitors 146. In some embodiments, a monitor 146 is integral with the water storage receptacle 102 or the lid 110, and in some embodiments a monitor 146 is inset so as to be flush with the surface of the receptacle 102 or lid 110. However, in embodiments, a monitor 146 is not integral with the lid 110 or the receptacle 102 and can be moved or relocated as a separate component.

In some embodiments, a monitor 146 can be operatively coupled with the water storage receptacle 102 so as to provide a display reflecting water and/or flow characteristics. For example, the water purification system 100 can have one or more sensors operatively coupled with the water storage receptacle and operable to provide data corresponding to at least one of flow characteristics or water characteristics. A monitor 146 may be configured to display data provided by the one or more sensors. In some embodiments, a monitor 146 can be operatively coupled with the power source 152 so as to determine and/or provide a display reflecting power generation and/or consumption levels. In some embodiments, a monitor 146 can display an estimate of rates, times, and/or quantities regarding how much water can be purified based at least in part on the determined amount of power, water, and/or flow characteristics. In accordance with a variety of different embodiments, a monitor 146 can be configured to show one or more characteristics including, but not limited to, intake flow, output flow, pH levels, organic parts per million (ppm), mineral ppm, power generated, power consumed, and battery charge level.

In some embodiments, a monitor 146 can also act as a regulator. For example, in some embodiments, a monitor 146 can be used to adjust power consumption and/or storage aspects. In some embodiments, a monitor 146 can be configured to inject pH balance equalizer. In some embodiments, a monitor 146 can be used to display and/or set a water quality setting. For example, water quality can range on a descending scale according to whether the water would be acceptable for medical treatment, drinking, cooking, hand-washing, bathing, or irrigating, but water quality setting levels also need not be so limited. In an example embodiment, the water quality setting could be adjusted to allow a higher ppm in the output water, based at least in part upon different factors such as a reduced level of required purification (e.g. to produce water for irrigating rather than drinking) or power considerations (e.g. to conserve power during shortages).

In embodiments, water purification system 100 has a float cut-off switch 148. A float cut-off switch 148 can be configured to deactivate the pump 104. In embodiments, a float cut-off switch 148 is configured to deactivate the pump 104 based on the water level in the water storage receptacle 102. In embodiments, the float cut-off switch 148 can be calibrated to automatically deactivate the pump 104 when the water level reaches a designated level.

In some embodiments, one or more component mounts 150 are provided. A component mount 150 can be configured to support one or more of a number of different components of the purification system 100 relative to the water storage receptacle 102. For example, as depicted in FIG. 5, in accordance with a variety of different embodiments, a component mount 150 can be configured to support one or more components including, but not limited to, a pump 104, a filter 106, a power source 152 (e.g. a Stirling engine, a solar panel 128, a battery 136, or another way to supply power to a pump 104 or a monitor 146), a Fresnel lens, a solar panels array 130, a battery 136, a power inverter 138, a transformer 140, a lid 110, a tie down 124, or a monitor 146.

In various embodiments, the water storage receptacle 102 can be used to primarily store water in one configuration and to primarily store components in another configuration. In embodiments, the contents of the water storage receptacle 102 depends upon whether the water purification system 100 is in a transport or an operate mode. In an example embodiment, during initial fabrication of the water purification system 100, individual components including a pump 104, a reverse osmosis filter 106, a bi-fold solar panel array 130, and a battery 136 are packed into a water storage receptacle 102 to be in transport mode for relocation of the system 100 to a site where water is to be purified. Upon arrival to the site, a user can remove these components from the water storage receptacle 102 and convert the system 100 into an operation mode by plugging a power output cord from the array 130 into the battery 136 for charging, connecting the battery to the pump 104, and coupling the pump 104 and the reverse osmosis filter 106 between a water source and the water storage receptacle 102 so that a purified water output is routed into water storage receptacle 102. Thus, in this example embodiment, during operation of the system 100, components are no longer stored in the water storage receptacle 102, but purified water is stored therein. When the system 100 needs to be moved in this example embodiment, a user can convert the system 100 back from operation mode to transport mode by draining most or all of the water from the water storage receptacle 102 and placing most or all of the components therein so that the water storage receptacle 102 is primarily storing components and can be more easily moved as a unit. In further example embodiments, more or fewer components can be included in the water purification system 100 and/or components are connected in different orders and/or arrangements.

In some embodiments, the water purification system 100 is sized for storage or transport in great numbers. For example, as shown in FIG. 1, in embodiments, the lid 110 and the bottom of the water storage receptacle 102 can be flat so that one water purification system 100 can be stacked upon another water purification system 100 for storage or transport. In some embodiments, the bottom of a water storage receptacle 102 has a recess shaped to accommodate a monitor 146 or other feature protruding from the top of another water purification system 100 when the systems 100 are stacked. Additionally, in some embodiments, the water purification system 100 is sized to accommodate transport in uniform shipping containers as known in the art. One such embodiment is shown FIG. 3, where the water purification system 100 has a height dimension of 54 inches and a square lid dimensioned at approximately 24 inches per side; a set of such water purification systems could be stacked two high and four wide in most standard shipping containers.

Figure 7:
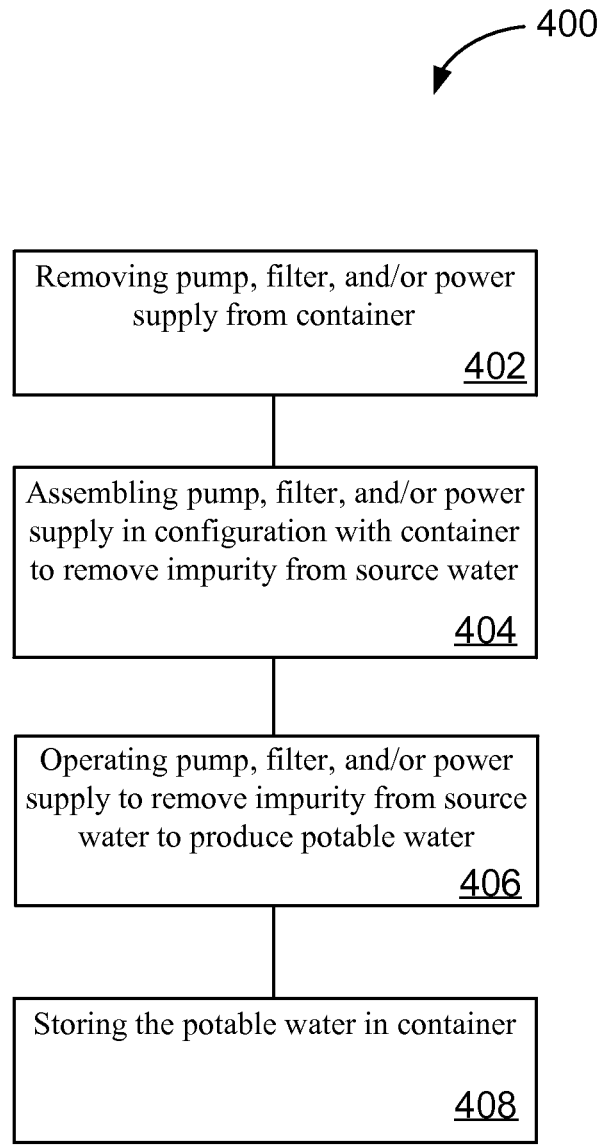
FIG. 7 is a simplified block diagram illustrating steps of a method for purifying water, in accordance with an embodiment.

FIG. 7 is a simplified block diagram illustrating steps of a method 400 for purifying water, in accordance with an embodiment. In embodiments, the water purification system 100 can be used in practicing the method 400. In step 402, at least one of a pump, a reverse osmosis filter, and/or a power supply is removed from a container. In step 404, at least one of the pump, the reverse osmosis filter, and/or the power supply removed in step 402 are assembled in a configuration with the container from step 402 to remove at least an impurity from source water. In step 406, at least one of the pump, the reverse osmosis filter, and/or the power supply assembled in step 404 are operated to remove at least the impurity from the source water to produce potable water. In step 408, the potable water produced in step 406 is stored in the container from which the items were removed in step 402.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A configurable water purification system, comprising:
a water storage receptacle defining a space within the water storage receptacle, the space having a size that defines a water storage capacity of the water storage receptacle;
a pump;
a power source comprising a Stirling engine;
at least one fresnel lens to focus solar energy on a heat exchanger of the Stirling engine;
a solar positioning apparatus that adjusts a position of the at least one fresnel lens relative to a base of the solar positioning apparatus in response to an angle of incoming light determined based at least in part on a location of a portion of a light sensing surface illuminated by light passing through an aperture, wherein the solar positioning apparatus comprises a downwardly-extending projection with a curved edge and at least two legs, and wherein the solar positioning apparatus based at least in part on the determined angle of incoming light lengthens or shortens one of the at least two legs so as to rotate the solar positioning apparatus along the curved edge of the downwardly-extending projection to modify both pitch and roll of the at least one fresnel lens and adjust the position of the at least one fresnel lens for aligning the at least one fresnel lens for focusing with the incoming light on the heat exchanger of the Stirling engine; and
a filter;
the water storage receptacle, the pump, the power source, the solar positioning apparatus, and the filter being configurable between:
(1) an operation configuration in which the solar positioning apparatus is positioned outside of the space and aligns the at least one fresnel lens for focusing solar energy on the heat exchanger of the Stirling engine to provide power from the power source, the power source is positioned outside of the space and provides the power to operate the pump, the pump is positioned outside of the space and operable to provide source water to the filter, the filter is positioned outside of the space and operable to convert the source water into purified water, wherein the purified water is stored within the space of the water storage receptacle in the absence of the pump, the power source, the solar positioning apparatus, and the filter; and
(2) a storage configuration in which at least one of the pump, the power source, the solar positioning apparatus, or the filter is stored within the space of the water storage receptacle.

2. The configurable water purification system of claim 1, wherein the solar positioning apparatus determines the angle of incoming light by a sensor remote from the solar positioning apparatus.

3. The water purification system of claim 1, further comprising a frame supporting the at least one fresnel lens and different from a support surface on which the solar positioning apparatus rests;
wherein the downwardly-extending projection with a curved edge extends downwardly from an underside of the frame and is coupled with a first portion of the frame;
wherein the at least two legs extend from the underside of the frame and are coupled with a second portion of the frame different from the first portion of the frame so that the at least two legs are spaced apart from the curved edge of the downwardly-extending projection;
wherein as the solar positioning apparatus lengthens or shortens one leg of the at least two legs, the at least two legs and the curved edge of the downwardly-extending projection collectively provide at least three points of contact with the support surface on which the solar positioning apparatus rests; and
wherein as the solar positioning apparatus lengthens or shortens the one leg of the at least two legs from a first length to a second length, the downwardly-extending projection changes from contacting the support surface at a first point along the curved edge to contacting the support surface at a second point along the curved edge different from the first point.

\* \* \* \* \*